(12) United States Patent
Brunel

(10) Patent No.: US 6,305,220 B1
(45) Date of Patent: *Oct. 23, 2001

(54) FUEL GAUGING SYSTEM FOR A MOTOR VEHICLE FUEL TANK

(75) Inventor: Daniel Brunel, Chalons-en-Champagne (FR)

(73) Assignee: Marwal Systems (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/043,756
(22) PCT Filed: Jul. 24, 1997
(86) PCT No.: PCT/FR97/01383
  § 371 Date: Mar. 25, 1998
  § 102(e) Date: Mar. 25, 1998
(87) PCT Pub. No.: WO98/04890
  PCT Pub. Date: Feb. 5, 1998

(30) Foreign Application Priority Data

Jul. 26, 1996 (FR) .................................................. 96 09433

(51) Int. Cl.⁷ ............................ G01F 23/32; G01F 23/36; G01F 23/52; G01F 23/30; G01F 23/60
(52) U.S. Cl. ................................ 73/317; 73/305; 73/309; 73/313; 73/315; 73/DIG. 5; 116/228; 116/229; 338/33
(58) Field of Search ............................. 73/317, 313, 305, 73/314, DIG. 5, 309, 315, 318, 290 R; 116/228, 229; 338/33

(56) References Cited

U.S. PATENT DOCUMENTS

| | | | |
|---|---|---|---|
| 4,928,526 | * | 5/1990 | Weaver .................................. 73/317 |
| 5,085,078 | * | 2/1992 | Baux et al. ............................ 73/313 |
| 5,140,303 | * | 8/1992 | Meyer ............................... 340/450.2 |
| 5,341,679 | * | 8/1994 | Walkowski et al. .................... 73/317 |
| 5,765,435 | * | 6/1998 | Grotschel et al. ..................... 73/313 |

\* cited by examiner

Primary Examiner—Hezron Williams
Assistant Examiner—Dennis Loo
(74) Attorney, Agent, or Firm—Blakely Sokoloff Taylor & Zafman

(57) ABSTRACT

A fuel gauging system for a motor vehicle fuel tank, including a housing (100) supporting a resistive element (200), an arm (300) pivotally mounted on the housing (100) and comprising at least one cursor (350) engaging the resistive element (200), and a lever (400) provided with a float connected to the arm (300) for monitoring the movements thereof. The system includes a housing (100) and an arm (300) which comprise complementary rotational guides (120, 310) and structure (316, 317, 318, and 319) to enable translation of the arm (300) on the housing (100). The arm (300) is combined with an L-shaped lever (400) so that one of the sections (420) defines the pivot axis of the device.

8 Claims, 3 Drawing Sheets

Figure 7:
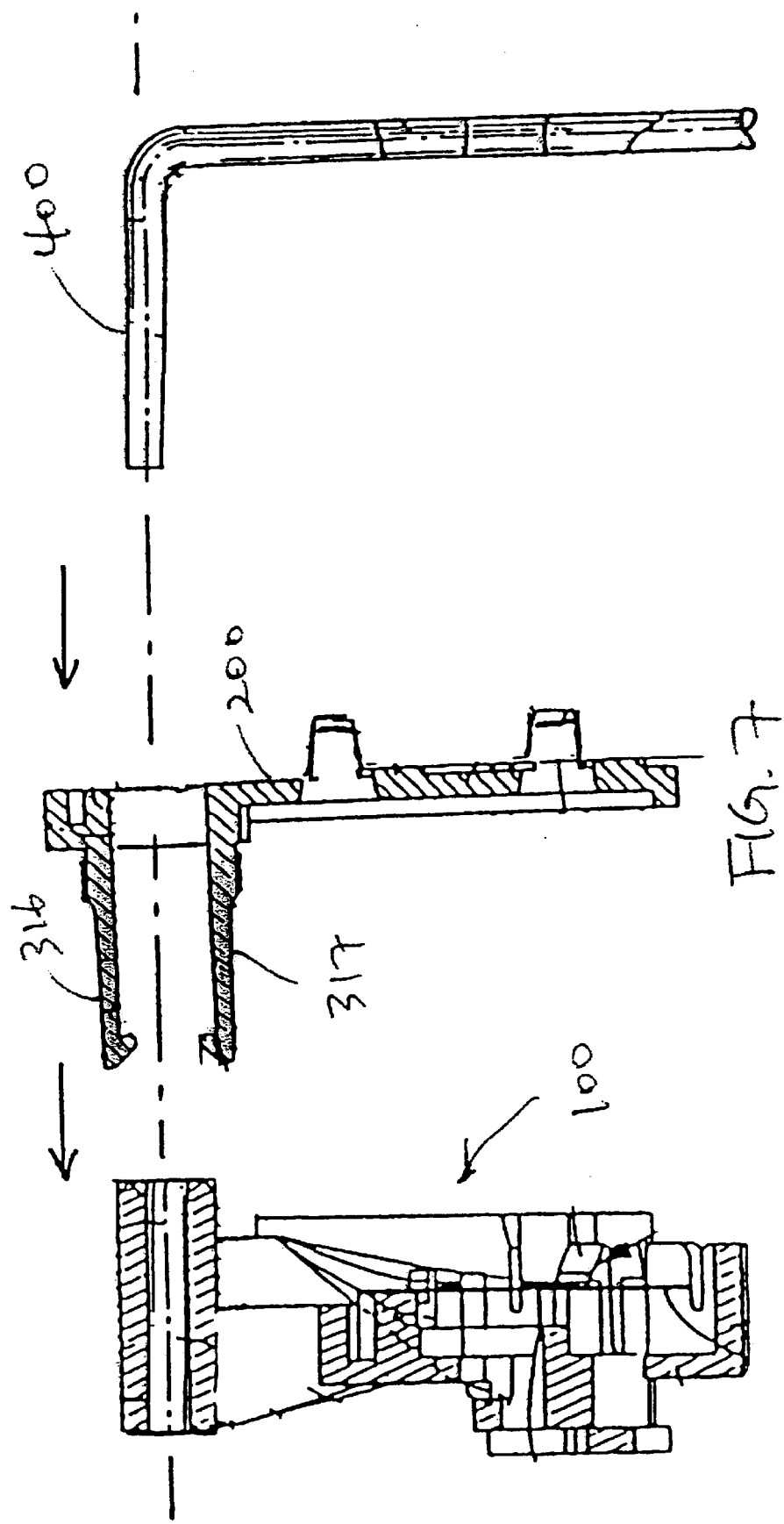

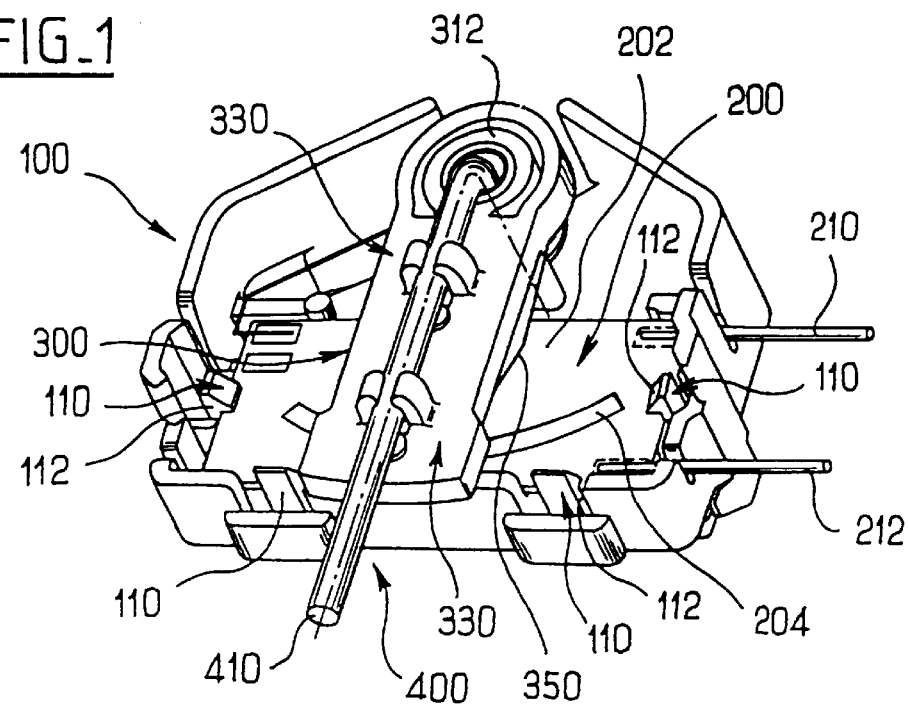
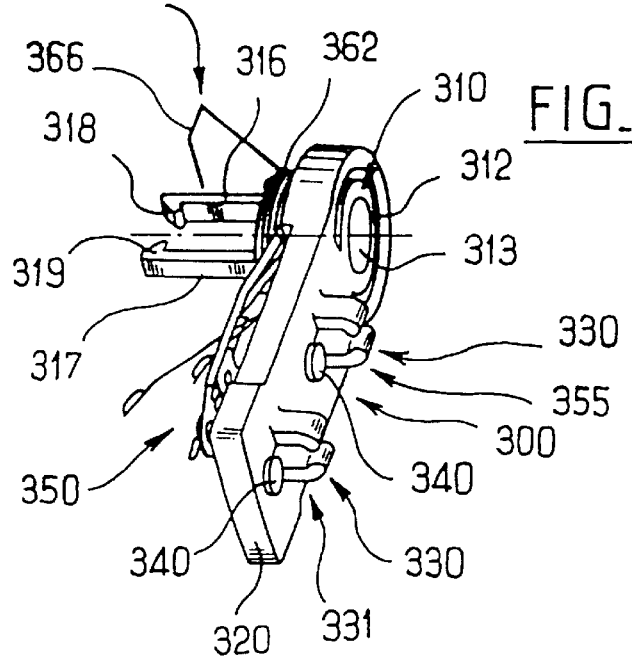
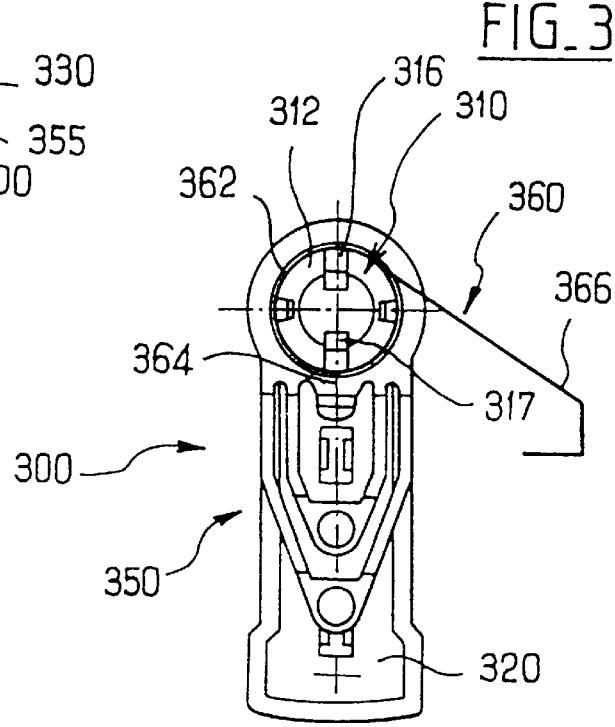

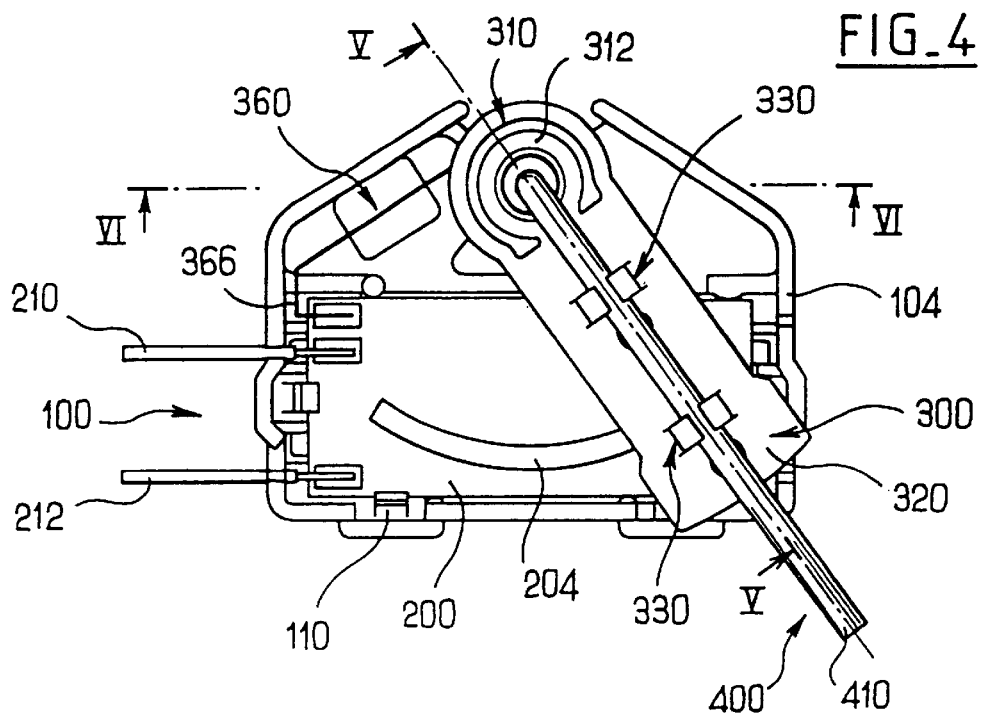
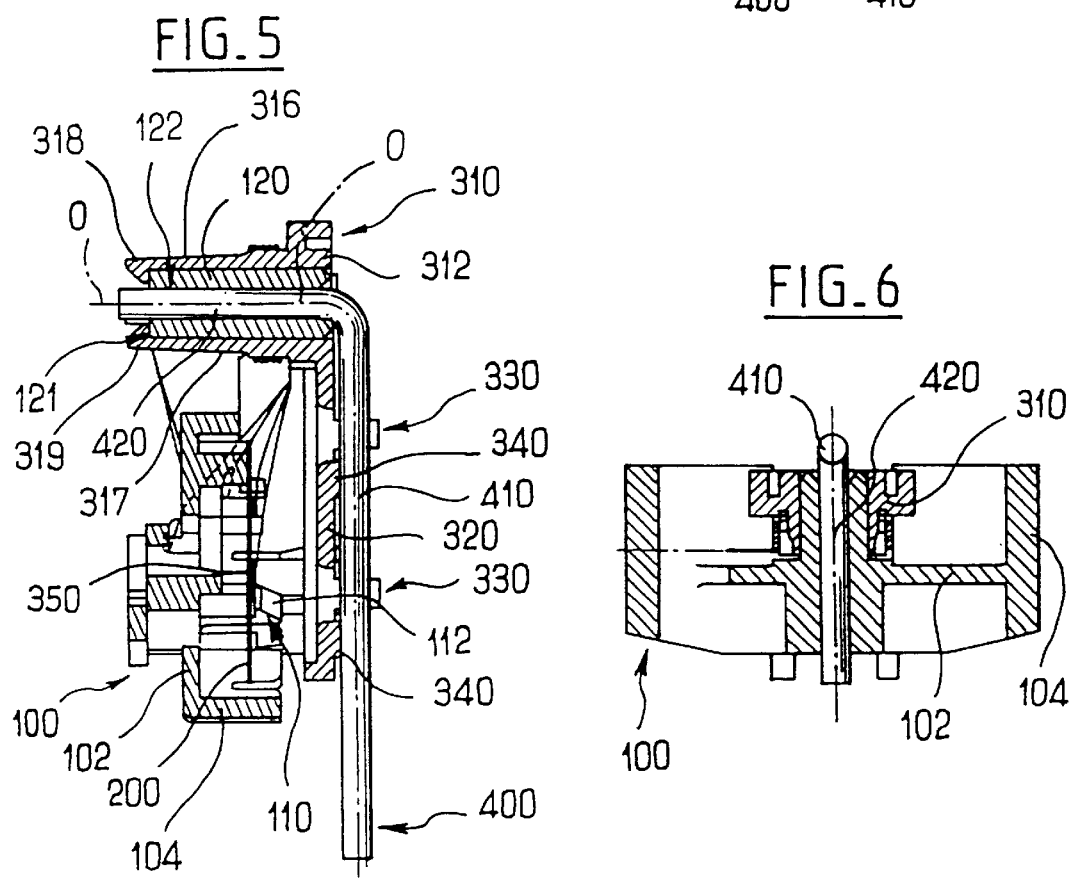

FUEL GAUGING SYSTEM FOR A MOTOR VEHICLE FUEL TANK

The present invention relates to the field of fuel gauging devices for motor vehicle tanks.

More specifically, the present invention relates to gauging devices of the known type comprising a housing which bears a resistive element, an arm mounted so that it can move on the housing and comprising at least one cursor which rests against the resistive element and a lever fitted with a float, connected to the arm for controlling the movements thereof.

Numerous devices of this kind have already been proposed.

Reference could, for example, be made to the documents FR-A-2661498, U.S. Pat. No. 4,870,861, DE-A-3627116, GB-A-2083628, FR-A-2533694, GB-A-1159806, GB-A-2048495, EP-A-0007072, FR-A-2364599, U.S. Pat. Nos. 1,771,794, and 3,200,646.

The present invention now has the object of improving the known fuel gauging devices.

In particular, the object of the present invention is to simplify the assembly of gauging devices.

Another object of the present invention is to limit the initial size of the housing which houses the resistive element so as, on the one hand, to make the tests prior to installation on vehicle easier, and on the other hand, make the devices easier to store.

Another object of the present invention is to improve the reliability of the known gauging devices.

These objects are achieved according to the present invention by means of a fuel gauging device, of the known type, comprising a housing which bears a resistive element, an arm mounted so that it can pivot on the housing and comprising at least one cursor which rests against the resistive element and a lever fitted with a float connected to the arm to control the movements thereof, characterized in that the housing and the arm comprise complementary rotational-guidance means, and means for translationally immobilizing the arm on the housing and that the arm is adapted to receive an L-shaped lever so that one of the branches of the lever provides the functional pivot axis of the device.

According to another advantageous feature of the invention, the means for translationally immobilizing the arm on the housing are formed of snap-fit tabs secured to the arm and adapted to interact with a bushing secured to the housing.

Other features, objects and advantages of the present invention will become clear on reading the detailed description which will follow, and on studying the appended drawings which are given by way of nonlimiting example, and in which:

FIG. 1 depicts a diagrammatic perspective view of a fuel gauging device in accordance with the present invention, FIG. 2 depicts a diagrammatic perspective view of a pivoting arm with which this device is equipped, FIG. 3 depicts a plan view of the same arm, FIG. 4 depicts a plan view of the gauging device of FIG. 1, FIGS. 5 and 6 depict two sectional views of this device on sectioning planes referenced V—V and VI—VI in FIG. 4.

FIG. 7 depicts an exploded sectional view of the fuel gauging device in FIG. 5 with a pivot arm and a level detached from a housing.

As was mentioned earlier, the gauging device in accordance with the present invention essentially comprises: a housing 100, a resistive element 200, a pivoting arm 300 and a lever 400.

The housing 100 may be produced in various alternative ways. As a preference, it is produced as a single piece by molding from plastic. As an alternative, however, the housing 100 could be produced by assembling a number of components.

The housing 100 essentially consists of a cage comprising a planar base wall 102 perpendicular to the axis O—O of pivoting of the arm 300 and of a peripheral edge wall 104, which is transverse with respect to the base wall 102 and parallel to the axis of pivoting O—O.

As can be seen in particular in FIGS. 1, 4 and 5, the housing 100 is preferably fitted, near the edge 104, and inside the latter, with several elastic tabs with teeth 110 designed to hold the resistive element 200 elastically.

According to the particular and nonlimiting embodiment illustrated in the appended figures, four elastic tabs 110 are also provided. These extend from the base wall 102, appreciably parallel to the edge wall 104 in the direction of the periphery of the opening of the cage 100. Each tab 110 has a tooth 112 at its free end which is the opposite end to the base wall 102.

The housing 100 further possesses, molded integrally with the base wall 102, a cylindrical bushing 120. The latter is centered on the axis O—O and has a central cylindrical passage 122. The bushing 120 thus extends at right angles to the base wall 102, preferably close to the peripheral wall 104.

It will be noted that the axial end of the passage 122 pointing toward the open periphery of the housing 100 is flared (see in particular FIGS. 5 and 6) to make it easier to insert the lever 400.

The resistive element 200 is preferably formed of a planar printed-circuit board 202 provided with a coating that defines a resistive track 204. The ends, or chosen regions of this resistive track 204 are connected to pins 210–212 which pass through the edge wall 104 of the housing to be accessible on the outside.

The contour of the board 202, which is preferably rectangular, complements the space defined between the tabs 110.

A person skilled in the art will understand that the printed circuit board 200 can be fitted into the housing 100 in a position parallel to the base wall 102, simply by translation in a direction perpendicular to the base wall 102. The printed circuit board 200 is automatically held in place by the tabs 110 once it has traveled past the teeth 112 thereof.

The arm 300 is preferably made as one piece by molding from plastic.

According to the particular and nonlimiting embodiment illustrated in the appended figures, the arm 300 comprises a hub 310 and a radial foot 320.

The hub 310 is formed essentially of a cylindrical ring 312 equipped with two snap-fit tabs 316–317. The ring 312 has an interior surface 313 which is cylindrical of revolution, with a radius that complements the outside radius of the bushing 120.

Thus, the hub 310 provides rotational guidance for the arm 300 on the housing 100 when the ring 212 is engaged on the bushing 120.

The two tabs 316–317 extend parallel to the axis of the hub 310. They are preferably diametrically opposed with respect thereto. The tabs 316–317 are each equipped, at their free end which is the opposite end to the ring 312, with a tooth 318–319 facing radially inward, that is to say facing toward the axis of the hub 310. As can be seen in FIG. 5, the position of the teeth 318–319 on the tabs 316–317 is such that these teeth 318–319 rest against the rear axial end 121 of the bushing 120 when the arm 300 is installed in position on the housing 100.

Thus, the tabs 316–317 equipped with teeth 318–319 have the function of translationally immobilizing the arm 300 on the housing 100 when the hub 310 is engaged on the bushing 120.

The foot 320 is straight and planar. It extends at right angles to the axis of the hub 310, i.e. radially with respect thereto.

As can be seen in FIGS. 2 and 5, to make it easier for the arm 300 to be engaged on the bushing 120, the radially internal surfaces of the teeth 318–319 facing away from the ring 312 are bevelled toward the ring 312 in the direction toward the axis thereof.

Thus, as the arm 300 is being assembled on the housing 100, the tabs 316–317 are first of all deformed radially outwards, until the teeth 318–319 get past the axial end 121 of the bushing 120. Once this position has been reached, the tabs 316–317 return to their original position. The ring 312 is then engaged over the outside of the bushing 120 to provide rotational guidance of the arm 300, and the teeth 318–319 come to rest against the axial end 121 of the bushing 120 to translationally immobilize the arm 300.

The system in this condition is a system that can be tested. What this means is that the arm 300 can be pivoted about its axis of rotation O—O on the housing 100 to check the information available between the output pins 210–212, and if necessary adjust the resistive track 204 to obtain the desired response as a function of the pivoting of the arm 300. Such testing and adjustment are possible at this stage of the assembly, according to the invention, even though the lever 400 has not yet been placed on the device, thanks to the fact that the arm 300 is guided in its rotation accurately about its axis and held in terms of translation. An adjustment stage of this kind, which is in itself known to those skilled in the art and carried out, for example, by localized attack (using a laser or the like) of the track 204 will not be described hereafter. However, it will be noted that in this condition, the system takes up a small amount of space because the lever 400 has not been fitted to the housing 100.

Of course, the arm 300 is pre-fitted with the electrically conductive cursor 350 which interacts with the resistive track 204. This cursor can be produced in a number of ways known to those skilled in the art.

It may comprise two elastic leaves resting against a common track 204 for redundancy and reliability purposes. It may alternatively comprise two elastic leaves resting against different resistive tracks or against different, respectively resistive and electrically conductive tracks. According to yet another alternative, as illustrated in the appended figures, the cursor 350 may be permanently connected to one terminal of the printed circuit 200 by a wire 360 which is wound in a spiral 362 around the hub 310. One of the ends 364 of the wire 360 is connected directly to the cursor 350 while the second end 366 of the wire 360 is connected to a terminal of the printed circuit 200.

According to the invention, the lever 400 has an overall L shape, comprising a main leg 410 and a shorter secondary leg 420. The main leg 410 is designed to take, at one of its ends, a float adapted to follow the changes in level of fuel in the tank. Such a float, which is conventional in should is not illustrated in the appended figures, in order to simplify the illustration.

The auxiliary leg 420 is provided at the second end of the main leg 410.

The outside diameter of the auxiliary leg 420 complements the diameter of the internal passage 122 formed in the bushing 120.

Thus, via its auxiliary leg 420, the lever 400 provides the functional pivot axis of the device, that is to say that the leg 420 provides the functional rotational guidance of the lever 400 and of the arm 300 on the housing 100, more specifically with respect to the bushing 120.

To this end, receiving means 330 are provided on the arm 320 for immobilizing the lever 400.

These immobilizing means 330 may be produced in many ways.

According to the particular embodiment illustrated in the appended figures, these means 330 comprise two grippers 331, 335, each formed of two curved jaws projecting from the exterior surface of the arm 300, more specifically from the radial foot 320 and designed in a way known per se to trap the main leg 410 of the lever. The aforementioned jaws of the grippers 331, 335 are molded integrally on the arm 320. They are oriented to receive the main leg 410 of the lever 400 oriented radially with respect to the axis of pivoting O—O.

As a preference, the leg 320 has projecting studs 340 against which the leg 410 rests once it has been installed.

A person skilled in the art will understand that the device in accordance with the present invention can be assembled simply by translating all of its components (board 200, arm 300 and lever 400 in turn) parallel to the axis O—O on the housing 100. Such assembly by translation along a single axis allows simple assembly by robot.

Furthermore, the possibility of testing and of adjusting the device prior to the fitting of the lever 400 makes it possible to limit the space taken up by the device and makes it easier to store.

In addition, the present invention makes it possible to produce a gauging device comprising a standard housing-100/board-200/arm-300 assembly which can be customized by adjusting the track 204 and by fitting a lever 400 which is specifically adapted to the particular application envisaged, at the last moment prior to installation in a given vehicle.

Of course, the present invention is not limited to the particular embodiment which has been described, but extends to any alternative in accordance with its spirit.

What is claimed is:

1. A fuel gauging device for a motor vehicle tank comprising:

a housing having a resistive element, an arm pivotally mounted to the housing and having at least one cursor which rests against the resistive element and a lever fitted with a float connected to the arm to control the movements thereof, wherein the housing arm comprise complementary rotational-guidance means for translationally immobilizing the arm on the housing, wherein the means for translationally immobilizing includes two elastic snap-fit tabs, each having an end and a tooth at its end, each secured to the arm and positioned to diametrically opposed relative to the axis O—O of pivoting of the arm, said snap-fit tabs secured to the arm being adapted to interact with a bushing secured to the housing, said lever including an L-shaped lever having two branches received on said arm so that one of the branches of the lever provides the functional pivot axis of the device, wherein said bushing includes an internal central passage that defines a diameter, wherein the diameter complements the branch of the lever forming the functional pivot axis of the device.

2. The fuel gauging device of claim 1 wherein the snap-fitting tabs include rims, wherein each rim is beveled to facilitate engagement with the bushing secured to the housing.

3. The fuel gauging device of claim 1 wherein the housing consists of a cage comprising a base wall perpendicularly secured to the bushing.

4. The fuel gauging device of claim 1 wherein the arm carries a cylindrical hub that defines a diameter, wherein the diameter of the cylindrical hub complements that of the bushing secured to the housing.

5. The fuel gauging device of claim 1 wherein the housing comprises several elastic tabs adapted to hold the resistive element.

6. The fuel gauging device of claim 5 wherein the elastic tabs for holding the resistive element run perpendicular to the base wall and parallel to the axis of the bushing accommodating, with pivoting, the arm so as to allow all of the components of the device to be engaged by a translational movement parallel to the axis of pivoting of the arm.

7. The fuel gauging device of claim 1 wherein the arm comprises a hub and a radial foot provided with means for immobilizing a main leg of the lever.

8. The fuel gauging device of claim 1 wherein the immobilizing means are formed of elastic grippers molded integrally on the arm.

\* \* \* \* \*

UNITED STATES PATENT AND TRADEMARK OFFICE
CERTIFICATE OF CORRECTION

PATENT NO.     : 6,305,220 B1
DATED          : October 23, 2001
INVENTOR(S)    : Brunel It is certified that error appears in the above-identified patent and that said Letters Patent is hereby corrected as shown below:

<u>Column 4,</u>
Line 50, after "housing" please insert -- and the --

Signed and Sealed this

First Day of June, 2004

JON W. DUDAS
*Acting Director of the United States Patent and Trademark Office*